Oct. 12, 1926.
J. F. MAYES
PISTON
Filed Jan. 4, 1926
1,603,135
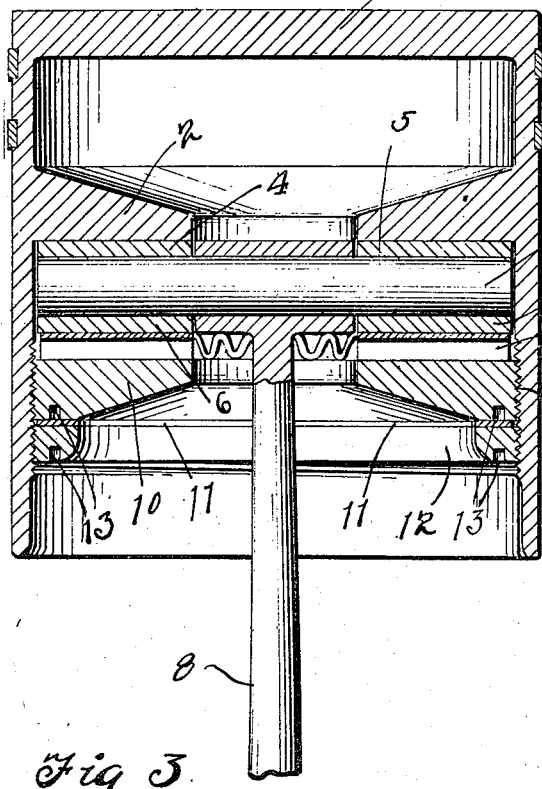
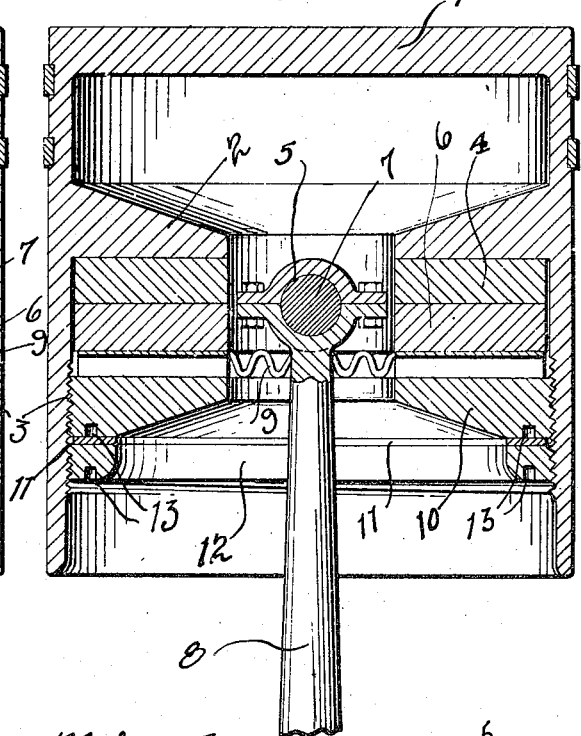
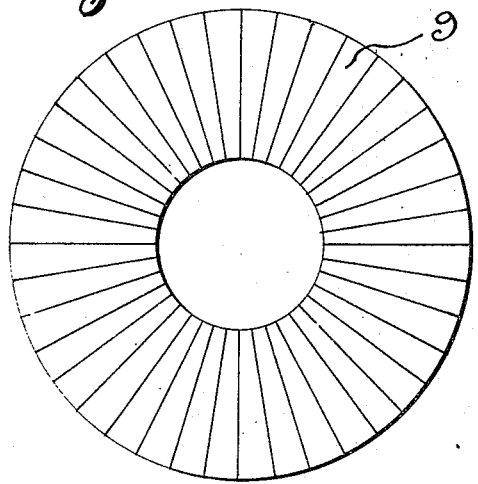
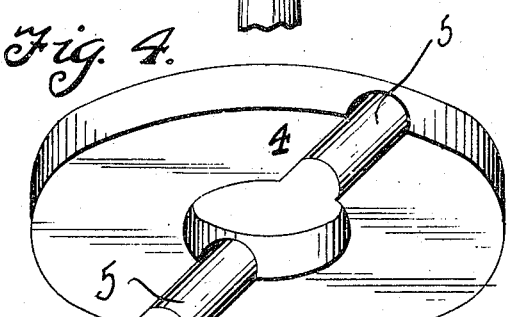
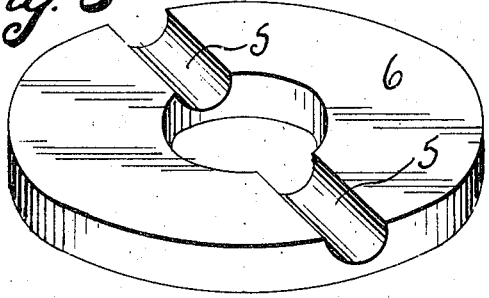
James F. Mayes, INVENTOR
BY Victor J. Evans
ATTORNEY
WITNESS: E. Stein.

Patented Oct. 12, 1926.

1,603,135

UNITED STATES PATENT OFFICE.

JAMES FRANKLIN MAYES, OF SHAWNEE, OKLAHOMA.

PISTON.

Application filed January 4, 1926. Serial No. 79,194.

This invention relates to improvements in pistons, the general object of the invention being to provide means whereby the wrist pin is so attached to the piston that the piston can rotate in the cylinder and the ends of the pin are covered by the piston which will prevent the pin from engaging the walls of the cylinder and will also reduce wear of the parts to a minimum.

Another object of the invention is to provide spring means for placing the wrist pin holding means under tension so as to take up wear.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through the improved piston.

Figure 2 is a similar view but taken at right angles to Figure 1.

Figure 3 is a view of the spring washer.

Figure 4 is a view of one of the bushing rings.

Figure 5 is a view of the other bushing ring.

In these views, 1 indicates the piston which is formed with an interior flange 2 above its center and an internal screw threaded part 3 below its center. The under face of the flange 2 forms a seat for a bushing ring 4 which is provided with oppositely arranged semi-circular recesses 5, which, with the similar recesses in the bushing ring 6, form bearings for the wrist pin 7 which connects the piston with the connecting rod 8. A spring washer 9, preferably formed of corrugated metal, is placed against the ring 6 and then a nut member 10 is threaded through the portion 3 to hold the parts assembled. This member engages the washer and is in turn engaged by a lock washer 11 which is held in position by a lock nut 12. The nuts are provided with the holes 13 so that they can be turned by a suitable tool.

From the foregoing, it will be seen that the wrist pin is supported in the piston by the rings 4 and 6 and that these rings are so supported in the piston that they can rotate in the space formed by the flange 2 and the nut 10. Thus when the parts are assembled in a motor, the piston can rotate in the cylinder so as to reduce wear of the parts and in view of the fact that the ends of the pin do not extend through the piston, there is no danger of the pin contacting with the walls of the cylinder as is the case with motors as now constructed.

While I prefer to use the spring washer 9, this washer can be omitted, if desired.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A piston having an internal flange above its center and an internal screw threaded part below its center, a bushing ring in the piston engaging the under face of the flange, a second bushing ring in the piston, said rings having recesses forming bearings, a wrist pin engaging the bearings, a nut engaging the threaded part of the piston for rotatably holding the bushing rings in place and a corrugated spring washer arranged between the nut and the lower bushing ring In testimony whereof I affix my signature.

JAMES FRANKLIN MAYES.